(12) United States Patent
Kovacs et al.

(10) Patent No.: US 9,100,959 B2
(45) Date of Patent: Aug. 4, 2015

(54) CARRIER SELECTION

(75) Inventors: Istvan Zsolt Kovacs, Aalborg (DK); Frank Frederiksen, Klarup (DK); Luis Garcia, Aalborg (DK)

(73) Assignee: Nokia Solutions and Networks Oy, Espoo (FI)

( * ) Notice: Subject to any disclaimer, the term of this patent is extended or adjusted under 35 U.S.C. 154(b) by 74 days.

(21) Appl. No.: 13/808,768

(22) PCT Filed: Jul. 8, 2010

(86) PCT No.: PCT/EP2010/059831
§ 371 (c)(1),
(2), (4) Date: Mar. 26, 2013

(87) PCT Pub. No.: WO2012/003874
PCT Pub. Date: Jan. 12, 2012

(65) Prior Publication Data
US 2013/0182690 A1    Jul. 18, 2013

(51) Int. Cl.
*H04W 72/04* (2009.01)
*H04W 16/06* (2009.01)
*H04W 72/08* (2009.01)

(52) U.S. Cl.
CPC .......... *H04W 72/0426* (2013.01); *H04W 16/06* (2013.01); *H04W 72/082* (2013.01)

(58) Field of Classification Search
USPC .......................... 370/252, 280, 329, 331, 336
See application file for complete search history.

(56) References Cited

U.S. PATENT DOCUMENTS

| 5,920,819 | A | 7/1999 | Asanuma | 455/447 |
| 6,353,645 | B1* | 3/2002 | Solve et al. | 375/354 |
| 2009/0310563 | A1* | 12/2009 | Chou et al. | 370/331 |

OTHER PUBLICATIONS

R1-091779, 3GPP TSG RAN WG1 #57 Meeting, US, San Francisco, May 4-8, 2009, "Primary Component Carrier Selection, Monitoring, and Recovery", Nokia Siemens Networks, Nokia, 7 pgs.
R1-094659, 3GPP TSG RAN WG1 #59 Meeting, Jeju, South Korea, , Nov. 9-13, 2009, "Autonomous CC selection fo heterogeneous environments", Nokia Siemens Networks, Nokia, 5 pgs.
R1-102951, 3GPP TSG RAN WG1 Meeting #61, Montreal, Canada, May 10-14, 2010, "Autonomous Base Component Carrier selection results in dense urban area scenario", 12 ogs.

* cited by examiner

*Primary Examiner* — Curtis A Alia
(74) *Attorney, Agent, or Firm* — Harrington & Smith

(57) ABSTRACT

The invention relates generally to mobile communication networks. More particularly, the invention relates to interference management and carrier selection for transmitting data. There is provided a solution for improved selection of a cell-specific base carrier, the solution utilizing a timing framework for the carrier selection. The solution includes determining a maximum allowed time duration, and performing within the determined maximum allowed time duration: obtaining information related to one or more selected carriers from at least one neighboring base station, selecting the at least one cell-specific base carrier for data transmission on the basis of the obtained information, and informing the at least one neighboring base station of the selected cell specific base carrier.

16 Claims, 4 Drawing Sheets

CARRIER SELECTION

FIELD

The invention relates generally to mobile communication networks. More particularly, the invention relates to interference management and carrier selection for transmitting data.

BACKGROUND

Interference management is of great importance in radio communication networks. Without proper interference management, the resources of the network cannot be efficiently utilized. Inter-cell Interference may be caused when a base station applies same carrier frequency as another, neighboring base station such that the signals from the two base stations interfere each other.

In order to avoid or mitigate such interference, a so-called autonomous component carrier selection (ACCS) is provided. According to the ACCS, each base station aims at selecting a carrier that does not interfere with the carrier of another base station. The base stations utilize information obtained from the neighboring base stations when initially selecting a suitable carrier.

However, there are problems related to the ACCS. These problems include lack of sufficient information from the neighboring base station, uncertainty of the availability and the correctness of the selected carrier, etc. Thus, it is important to provide an improved solution for the carrier selection.

BRIEF DESCRIPTION OF THE INVENTION

Embodiments of the invention seek to improve the carrier selection.

According to an aspect of the invention, there is provided a method as specified in claim 1.

According to an aspect of the invention, there are provided apparatuses as specified in claims 10 and 19.

According to an aspect of the invention, there is provided a computer program product as specified in claim 20. Embodiments of the invention are defined in the dependent claims.

LIST OF DRAWINGS

In the following, the invention will be described in greater detail with reference to the embodiments and the accompanying drawings, in which FIG. 1 presents a network according to an embodiment;

DESCRIPTION OF EMBODIMENTS

The following embodiments are exemplary. Although the specification may refer to "an", "one", or "some" embodiment(s) in several locations of the text, this does not necessarily mean that each reference is made to the same embodiment(s), or that a particular feature only applies to a single embodiment. Single features of different embodiments may also be combined to provide other embodiments.

Radio communication networks, such as the Long Term Evolution (LTE) or the LTE-Advanced (LTE-A) of the 3rd Generation Partnership Project (3GPP), are typically composed of at least one base station (also called a base transceiver station, a Node B, or an evolved Node B, for example), a user equipment (UE) (also called a user terminal (UT) and a mobile station (MS), for example) and optional network elements that provide the interconnection towards the core network. The base station connects the UTs via the so-called radio interface to the network.

Figure 1:
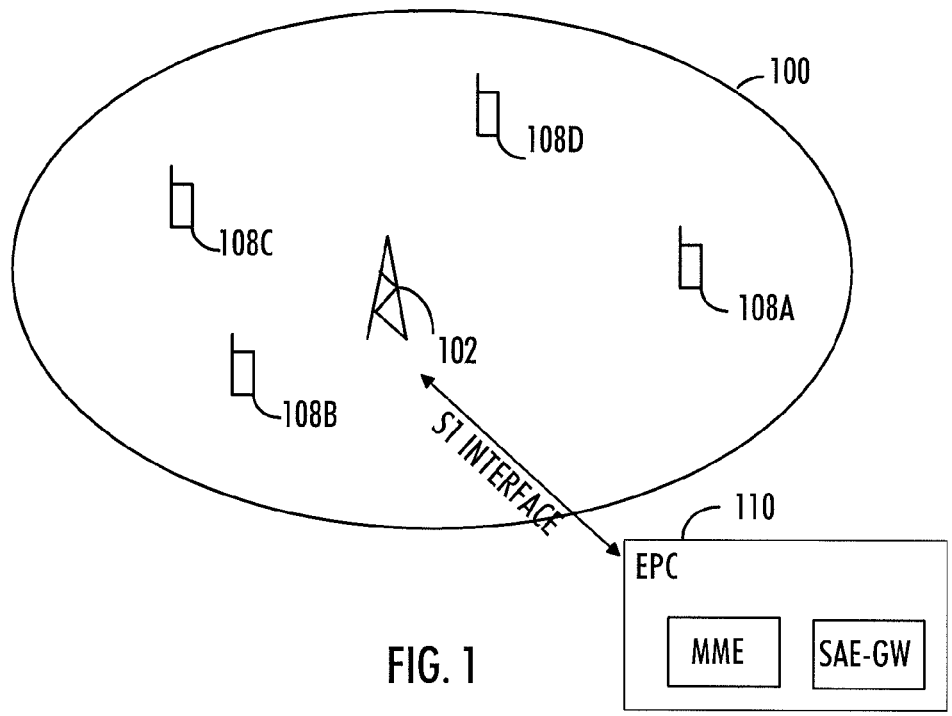

FIG. 1 shows a communication network, according to an embodiment. As explained, the communication network may comprise a base station 102. The base station 102 may provide radio coverage to a cell 100, control radio resource allocation, perform data and control signaling, etc. The cell 100 may be a macrocell, a microcell, or any other type of cell where radio coverage is present. Further, the cell 100 may be of any size or form, depending on the antenna system utilized.

In general, a base station 102 applicable to the embodiments may be configured to provide communication services according to at least one of the following communication protocols Worldwide Interoperability for Microwave Access (WiMAX), Universal Mobile Telecommunication System (UMTS) based on basic wideband-code division multiple access (W-CDMA), high-speed packet access (HSPA), LTE, and/or LTE-A. The base station 102 may additionally provide the second generation cellular services based on GSM (Global System for Mobile communications) and/or GPRS (General Packet Radio Service). The present embodiments are not, however, limited to these protocols.

The base station 102 may be used in order to provide radio coverage to the cell 100. The base station 102 may be seen as one communication point of the network. The base station 102 may also be called a wide area (WA) base station due to its broad coverage area. The base station 102 may be node B, evolved node B (eNB) as in LTE-A, a radio network controller (RNC), or any other apparatus capable of controlling radio communication and managing radio resources within the cell 100. The base station 102 may also have an effect on mobility management by controlling and analyzing radio signal level measurements performed by a user terminal, carrying out its own measurements and performing handover based on the measurements.

For the sake of simplicity of the description, let us assume that the base station is an eNB. The development of the evolved universal mobile telecommunication's system (UMTS) terrestrial radio access network (E-UTRAN), which is the air interface of the LTE, is concentrated on the eNB 102. All radio functionality is terminated here so that the eNB 102 is the terminating point for all radio related protocols. The E-UTRAN may be configured such that orthogonal frequency division multiple access (OFDMA) is applied in downlink transmission, whereas single carrier frequency division multiple access (SC-FDMA) may be applied in uplink, for example. In the case of multiple eNBs in the communication network, the eNBs may be connected to each other with an X2 interface as specified in the LTE.

The eNB 102 may be further connected via an S1 interface to an evolved packet core (EPC) 110, more specifically to a mobility management entity (MME) and to a system architecture evolution gateway (SAE-GW). The MME is a control plane for controlling functions of non-access stratum signaling, roaming, authentication, tracking area list management, etc., whereas the SAE-GW handles user plane functions including packet routing and forwarding, E-UTRAN idle mode packet buffering, etc. The user plane bypasses the MME plane directly to the SAE-GW. The SAE-GW may comprise two separate gateways: a serving gateway (S-GW) and a packet data network gateway (PGW). The MME controls the tunneling between the eNB and the S-GW, which serves as a local anchor point for the mobility between different eNBs, for example. The S-GW may relay the data between the eNB and the P-GW, or buffer data packets if needed so as to release them after appropriate tunneling has been established to a corresponding eNB. Further, the MMES and the SAE-GWs may be pooled so that a set of MMES and SAEGWs may be as-signed to serve a set of eNBs. This means that an eNB may be connected to multiple MMES and SAE-GWs, although each user terminal is served by one MME and/or S-GW at a time.

According to an embodiment, the eNB 102 may establish a connection with a user terminal (UT) 108A to 108D such as a mobile user terminal, a palm computer, user equipment or any other apparatus capable of operating in a mobile communication network. That is, the UT 108A to 108D may perform data communication with the eNB 102.

As interference management is clearly important for a cellular network, it has been identified that efficient interference management schemes are needed for the optimization of heterogeneous networks. The heterogeneous network is used for denoting a wireless networks using different access technologies. For example, a wireless network which provides a service through a wireless local area network (WLAN) and is able to maintain the service when switching to a cellular network is called a wireless heterogeneous network. In general, the heterogeneous network represents a deployment scenario where the cellular layout is not regular. That is, the distance between neighboring cells is not constant. There may also be base stations or eNBs of different nature. For example, they may be separated by their maximum transmit power in case a network of macro eNBs, pico and home eNBs (femto cell) are employed, where the two latter will have lower transmit power by default, and create cell coverage areas that do not have the same size.

Figure 2:
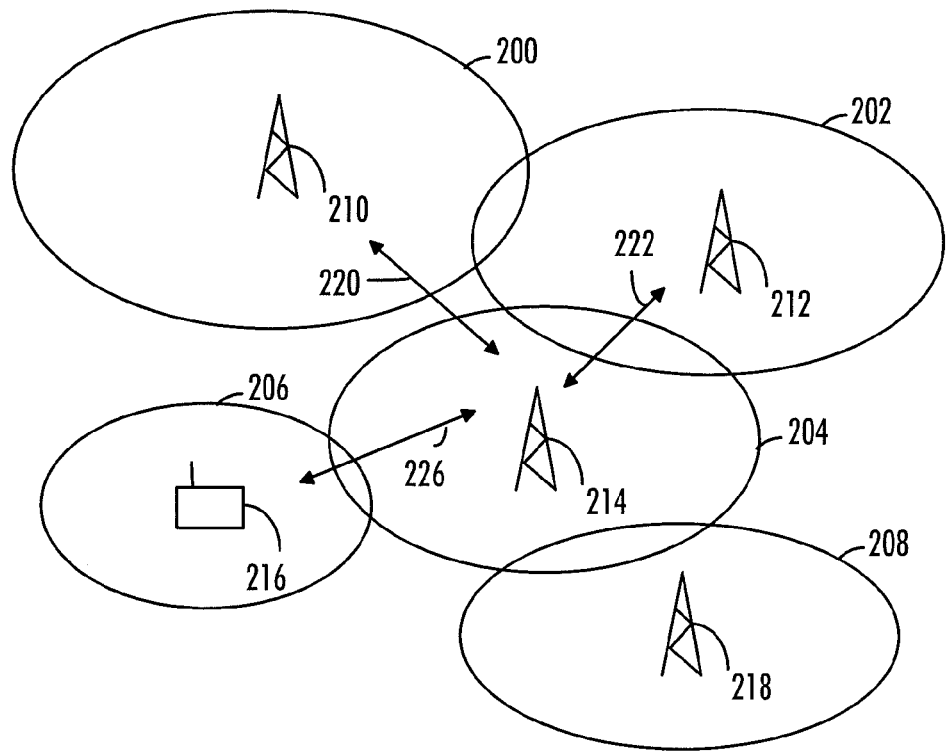
FIG. 2 shows another network according to an embodiment.

An exemplary network where the embodiments may be applied is shown in FIG. 2, where the network comprises five base stations 210 to 218, each of them providing radio coverage to a respective cell 200 to 208. In addition to public base stations (or eNBs) 210 to 214 and 218, the network may comprise a private base station 216. The private base station may also be called a femto cell. It may be established by a private user at his or her home or office, for example. The base stations (BS) 214 may communicate with the BSs 210, 212 and 216 via the X2 interfaces 220, 222 and 226, respectively. In the exemplary network of FIG. 2, it is assumed that the BS 218 is not active. That is, the BS 218 is on stand-by mode and is not connected to any of the other NS 210 to 216.

Figures 3, 4:
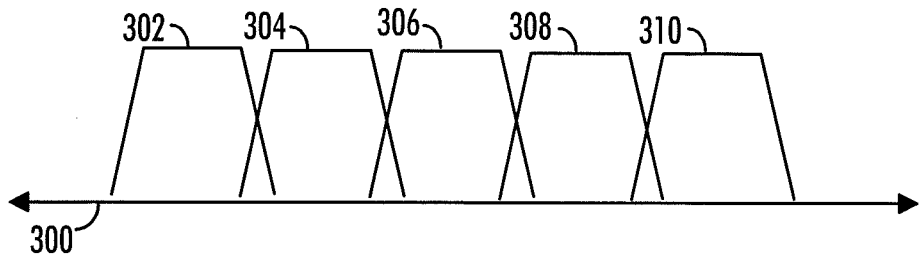
FIG. 3 shows aggregation of component carriers, according to an embodiment.
FIG. 4 illustrates a matrix of selected carriers, according to an embodiment.

One of the proposed interference management schemes for the LTE-Advanced utilizes a carrier aggregation (CA), where multiple component carriers are aggregated to provide necessary bandwidth. The CA is illustrated in FIG. 3, where multiple component carriers (or simply carriers) 302 to 310 are aggregated along the frequency domain 300. Access to large amounts of contiguous spectrum, in the order of 100 MHz, may not always be possible. The use of carrier aggregation provides a tool for alleviating this. From a baseband perspective, there is no difference if the component carriers are contiguous in frequency or not. This could allow for aggregating non-contiguous spectrum fragments by allocating different fragments to different component carriers. Whether carrier aggregation is used or not, and which component carriers to aggregate, may be predetermined as part of the system information. In an embodiment, the data streams from the different component carriers are aggregated above a media physical access (MAC) layer. This implies that hybrid-ARQ retransmissions are performed independently per component carrier. Further, transmission parameters such as a modulation scheme and a code rate may also be selected per component carrier. Having a structure allowing for independent operation per component carrier is useful in case of aggregating component carriers from different frequency bands with different radio-channel quality.

An exemplary interference management scheme is called the autonomous component carrier selection (ACCS). According to the ACCS, it is proposed that each cell automatically selects one of the component carriers as its primary carrier (also called the base carrier) when the BS is powered on. The base carrier is a cell-specific carrier, not the user terminal/equipment specific cell/carrier. Let us assume that in FIG. 2, the BS 214 is powered on. The initial selection of the cell-specific component carrier as the cell-specific base carrier (BC) is performed by the BS 214. The BS 214 then uses the BC for initial connection of terminals in the cell. For this reason, the BC may have full control common channel cell coverage regardless of the served UT capabilities.

Depending on the traffic in cell and the mutual interference coupling with the surrounding cells, transmission and/or reception on all component carriers may not always be the best solution, especially for the cell-edge users. As a consequence, each cell may dynamically select secondary (or supplementary) component carriers for transmission/reception. This may take place after having selected the base carrier. The component carriers not selected for base carriers or for supplementary carriers may be assumed to be muted (uplink/downlink) and not used by the cell. The supplementary (component) carriers (SC) may also be cell-specific. The selection of the SCs may be based upon a so-called background interference matrix (BIM) collected at each base station. The BS may perform both own measurements and/or derive information obtained either through user terminals/equipments or through the network when collecting the information for the BIM. The BIM is used by the base stations to determine if it is allowed to take additional component carriers into use without causing too low performance in the surrounding cells using the same carriers.

Let us discuss the selection of the base carrier (BC) further. As said, let us assume that in FIG. 2, the BS 214 is powered on. The BC selection may utilize inter BS reference symbol received power (RSRP) measurements, where the BS 214 measures the RSPR from its neighboring BSs 210, 212 and 216. It may be that the BS 214 measures the RSRP on the component carriers of the surrounding cells, and that knowledge of their corresponding reference symbol transmit power is available (for example, signaled between the BSs 210 to 216), so that the inter BS path loss can be estimated. When there is no standardized way of exchanging the transmit power between the BS 210 to 216, it may be assumed that all neighbor BSs transmit with the same power. When there is a mixture of macro sites (public BSs 210, 212) and home BSs (such as the private base station 216), it may further be assumed that different transmit powers exists according to the power class (and potential power control) of the BS. That is, different transmit powers may exist between the public BS 210 and the private BS 216, for example. The inter BS path loss measurements are used to ensure that only BSs with the largest possible path loss separation select the same component carrier for the base carrier.

In the network of FIG. 2 comprising BSs 210 to 218 and assuming the five available carriers 302 to 310 of FIG. 3, a matrix of FIG. 4 may be generated. In the matrix 400 each column corresponds to a detected neighboring BS 210, 212, 216 and 218 and the estimated path-loss to it, while each row corresponds to one of the configured system carriers 302 to 310. It is assumed that the BS 214 is switched on and is gathering the matrix 400. One element in the matrix indicates the type of the corresponding carrier 302 to 310 by each of the base stations 210 to 212 and 216 to 218. That is, is the BS 210 to 212 and 216 to 218 applying the carrier 302 to 310 as a base carrier (B) or a supplementary (S) carrier.

Each neighboring BS 210 to 212 and 216 to 218 may broadcast its own radio resource allocation table (RRAT) over a specified signaling channel over the X2 interface or via in-band inter BS over-the-air communication. The broadcast may instead be a point-to-point message when the signaling channel capacity allows this and the eNB IDs are available. According to an embodiment, the information related to one or more selected carriers from the at least one neighboring base station 210 to 212 and 216 to 218 indicates the one or more carriers the neighboring base station is applying and which of the one or more carriers applied is a base carrier primarily used for data transmission, wherein the possible carriers to be applied by any base station are predefined. Thus, the information received (for example, the RRAT) corresponds to one column in the matrix 400 and from all the received information the BS 214 can build the full matrix 400. The matrix can be called a component carrier allocation table (CCRAT). Naturally, the exact procedure to build and use the matrix 400 from the available information can be implementation-specific.

Further, a path-loss threshold parameter may be used so that any BS builds its matrix using the information only from the neighboring BSs which have an estimated path-loss below the predefined threshold, That is, the BS 214 may disregard the information received from a neighboring base station when it is determined that a propagation loss from the neighboring base station is above a predefined threshold. In FIG. 4, the column 402 is assumed to have been received but due to high path loss, the information is disregarded. This is beneficial so that the number of the available base carriers is not unnecessarily limited due to selections performed at a base station that is located relatively far away. The selection of a same carrier by these base stations may not cause any harm to each others because the carrier signal strength is sufficiently reduced at the considered remote BSs. Based on the path loss information, the BSs 210 to 212 and 216 to 218 may be sorted according to the experienced path loss.

By the information comprised in the matrix 400, a procedure for selecting the base carrier and the supplementary carriers may be performed. As an example, the selection of the base carrier may take place in the following manner:

1) When there are row entries in the matrix 400 with no B- or S-selections, then the component carrier corresponding to the row is selected. When there are multiple of such rows, either select randomly, or select the component experiencing the lowest received interference power).

2) When there are no free rows but there are row entries without "B", select one of those for the base carrier. When there are multiple rows without "B", select the carrier corresponding to the row entry with lowest number of "S" as the base carrier.

3) When all row entries include "B", select, as the base carrier, the component carrier with maximum path loss to the neighboring BS having the same carrier as its base carrier.

4) When there are multiple candidate component carriers for the base carrier according to the above rules 1 to 3, select the component carrier with lowest experienced interference. According to an embodiment, each BS always selects one base component carrier and zero or more supplementary carriers. The inter-BS RSRP measurements may only be needed by a new BS when they are switched on (standby off), and therefore have no transmission. After the new BS has selected its base component carrier it can start transmitting on that carrier, and can start to carry traffic. As the traffic demands for the cell increases, more component carriers may be selected as the supplementary carriers.

However, as assumed in FIG. 2, not all the BSs are active all the time. In FIG. 2, it is assumed that the BS 218 is not active. This can be due to long-term traffic demand patterns, e.g. time of the day dependent traffic, and also due to random activation/deactivation (power off/on) of the BS 218, e.g. in residential use cases. Further, in case of network energy saving scenarios where different nodes are switched off during 'idle' periods, time-domain variations may take place in the information from the neighboring BSs. This 'time-domain' aspect leads to the natural cases where the inter-BS matrix 400 collected at a given BS, may contain only partial information even for the entries corresponding to the set of BSs which would normally be below the path loss threshold used. In the matrix 400, the column corresponding to the BS 218 may not be received even though it would be below the propagation loss threshold if it was turned on.

Figure 5:
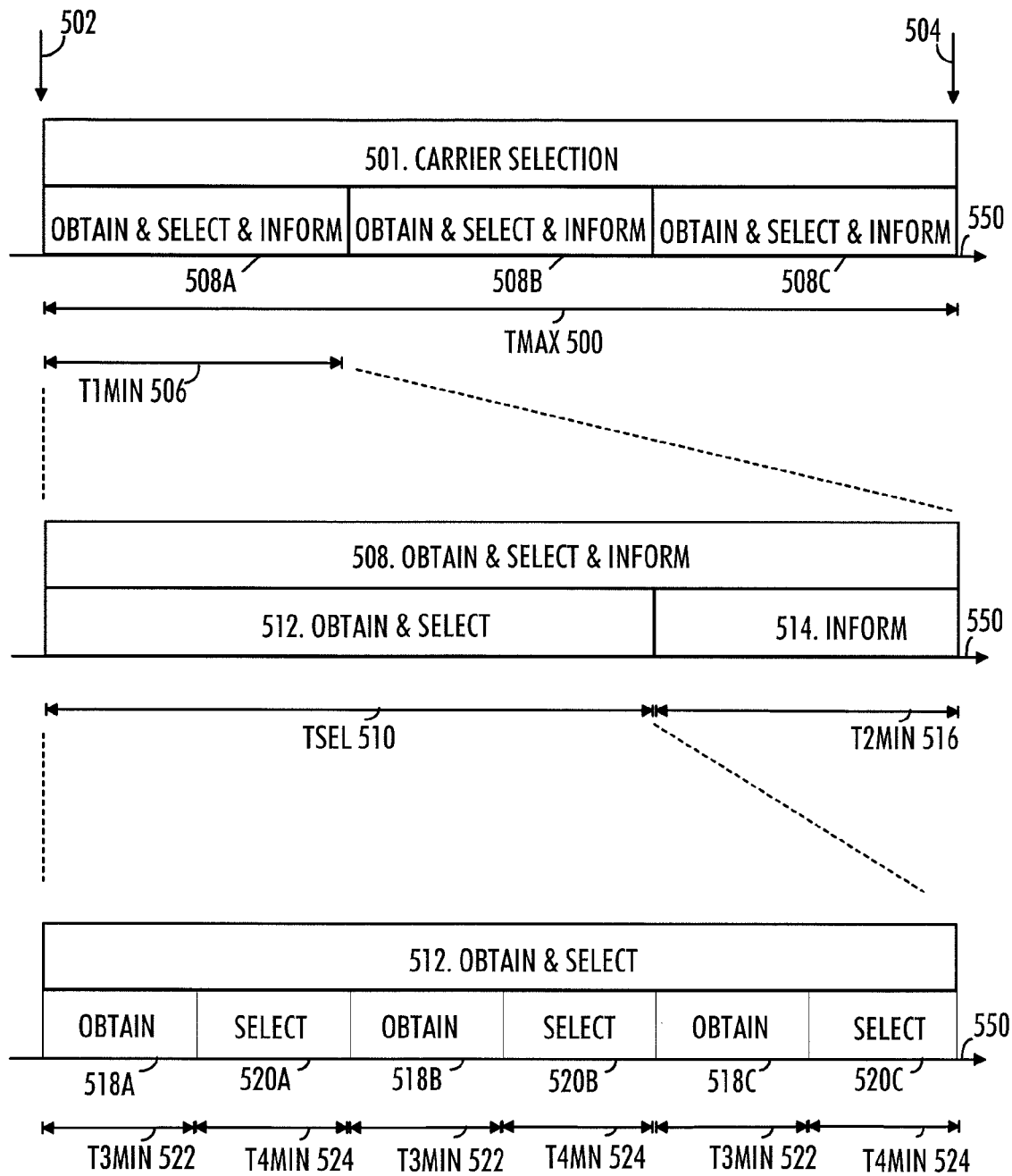
FIG. 5 illustrates a timing framework for the selection of the cell-specific carrier, according to an embodiment.

In order to improve the cell-specific base carrier selection procedure, the BS 214, according to an embodiment, determines a maximum allowed time duration TMAX 500 for the carrier selection 501, as shown in FIG. 5 along a time line 550. The BS 214 may perform the following within the determined maximum allowed time duration TMAX: obtaining information related to one or more selected carriers from at least one neighboring base station 210 to 212 and 216 to 218, selecting the at least one cell-specific base carrier for data transmission on the basis of the obtained information, and informing the at least one neighboring base station 210 to 212 and 216 to 218 of the selected cell-specific base carrier. The informing may happen either through the wireless interface or through the X2 interface, for example. The information informed to the at least one neighboring base station may be the RRAT, for example. When the information is broadcasted or informed in point-to-point communication, it is up to the receiving BS (eNB) to decide whether to use the information or not. In this sense, the BS 214 makes the information available for at least one neighboring base station 210 to 212 and 216 to 218. The maximum allowed time duration TMAX allows for avoiding the BC selection algorithm to get into a state of indecisiveness (where it toggles between a plurality of solutions that are perceived as being equally good, or potentially in case two base stations turned on at approximately the same time are forcing each other to use another carrier, thereby causing a ping-pong effect).

The maximum allowed time duration TMAX may start from the time instant 502 of the initiating trigger/event. Among possible triggers is the power-ON or standby-OFF by the corresponding BS, for example. Further, the period may be triggered by the BS 214 being switched on or after a reset. The period may also start when the BS 214 is switched on remotely or woken up after some "sleep mode". The period ends when the maximum allowed time duration TMAX expires at point 504. During the carrier selection 501, no user terminals are connected to the BS 214. After the carrier selection 501, the BS 214 may start to connect to UTs (UEs). In general, it is the user equipment that may discover the new base station and try to connect to it. When the base station (eNB) starts transmitting its common channels, the UE may discover it and may try to obtain access through the random access channel (RACH procedure).

According to an embodiment, the BS 214 may further determine a first minimum allowed time duration T1MIN 506. The BS 214 may then perform a process of obtaining information from at least one neighboring base station, selecting the cell-specific base carrier, and informing the at least one neighboring base station, wherein the duration of the process is at least the period of the first minimum allowed time duration T1MIN 506. The maximum duration of this process is the determined maximum allowed time duration TMAX 500.

The BS 214 may further repeat the process 508 of obtaining information from at least one neighboring base station, selecting the cell-specific base carrier, and informing the at least one neighboring base station, thus enabling reselection of the cell-specific base carrier, wherein the aggregate duration for the consecutive processes 508A to 508C is within the determined maximum allowed time duration TMAX 500. That is the overall maximum time limit for performing one or more of these processes 508 may be the determined maximum allowed time duration TMAX 500. This enables that a number of attempts are made for selecting the best BC. The repeating may be performed when new information from at least one neighboring base station is expected to be available. In each 508 period one or more eNB could be detected. Therefore the consequent 508 periods can be used for refining the CCRAT information from the previous 508 period(s). The number of repeated processes 508A to 508C may be implementation/vendor specific. The number may depend on how reliable BC selection is required: more repeated periods for the process 508 ensure more information collected.

The BS 214 may further obtain information of the selected cell-specific base carrier from the at least one neighboring base station 210 to 212 and 216 to 218 in the form of their RRAT information, for example. The information may be received as broadcasted information or as a point-to-point information. The information sending may be initiated by the neighboring eNB based on the running ACCS algorithms. However, the information may be also requested by the eNB 214. As a result, the BS 214 may repeat the process 508 when the obtained information indicates that interference above a predefined threshold is caused to at least one neighboring base station. In addition to the interference criteria or instead of the interference criteria, own BS measurements and/or combination of measurements and received RRAT may trigger a new attempt of defining the base carrier. The interference limit may be preconfigured to the BS 214 or given as initial setup. Thus, the proposed timing framework enables a negotiation phase where the BS 214 performing the carrier selection is allowed to re-evaluate its decision (for example, when it starts sending its decision it might get feedback on this). Hence, the number of attempts 508A to 508C within the maximum allowed time duration TMAX 500 timer will determine the number of 'negotiation' attempts.

According to an embodiment, the BS 214 may further dynamically determine the time duration for each repeated process 508A to 508C, the time duration being within the first minimum allowed time duration T1MIN 506 and the maximum allowed time duration TMAX 500. Thus, the BS 214 may during the process 508 (in real time) determine that more time is needed for this repeated process 508A to 508C. The decision to adapt the time duration for the process 508A to 508C may be based on based on available system information, for example, the number of detected neighboring BSs 210 to 212 and 216 to 218, etc. Other possible grounds for adapting the period may be preconfigured by the operator for their BSs or measured/estimated directly at the BS. Possible parameters to take into account include for example maximum transmit power, receiver category (if defined), antenna configuration (multiple-input multiple-output, etc), overall level of wideband interference detected at the BS 214, possible geo-location information indicating the eNB spatial densities.

The BS 214 may determine a selection time duration TSEL 510. The BS 214 may use the selection time duration for performing the process 512 of obtaining information from at least one neighboring base station 210 to 212 and 216 to 218 and selecting the cell-specific base carrier, wherein the duration of the process 512 is the selection time duration 510. The maximum time duration of the selection time duration TSEL 510 is based on the configured maximum allowed time duration TMAX 500 and the first minimum allowed time duration T1MIN 506. According to an embodiment, one selection time period TSEL 510 comprises at minimum one period 522 for obtaining the RRAT information from the neighboring base station 210 to 212 and 216 to 218 and one period 524 for selecting the cell-specific base carrier.

However, the processes 518A to 518C and 520A to 520C can be performed more than once within the selection time duration TSEL 510, as shown in FIG. 5. Thus, the BS 214 may dynamically decide to repeat the process of obtaining information (such as the RRAT information) from at least one neighboring base station 210 to 212 and 216 to 218 and selecting the cell-specific base carrier, wherein the aggregate duration of the consecutive processes 518A to 518C and 520A to 520C is the determined selection time duration TSEL 510. The number of the repeated processes 518A to 518C and 520A to 520C may be set dynamically (in real time during the selection duration TSEL 510) based on available system information, such as the number of the detected neighboring BSs 210 to 212 and 216 to 218. Thus, the process may be repeated when the number of neighboring base stations 210 to 212 and 216 to 218 exceeds a predefined threshold, for example.

The BS 214 may further determine a second minimum allowed time duration T2MIN 516 and perform the informing 514 of the at least one neighboring base station 210 to 212 and 216 to 218 for at least the period of the second minimum allowed time duration T2MIN 516. This ensures that all the neighboring base stations receive up-to-date information regarding the selected base carrier.

During the BC signaling, possibly via the RRAT, the BS 214 may send its decision over a backhaul signaling link (wired or wireless), or the BS 214 may start sending broadcast signaling and reference symbols to allow other BSs to sense the presence of this BS 214 and to include the signaled information into their corresponding CCRAT matrices 400 of FIG. 4. This enables for negotiation regarding which of the carriers is seen as the best choice for the base carrier when the information from the BS 214 has been added to the overall system.

According to an embodiment, the BS 214 may further determine a third minimum allowed time duration T3MIN 522 and perform the obtaining of the information from the at least one neighboring base station 210 to 212 and 216 to 218 for at least the period of the third minimum allowed time duration T3MIN 522.

According to an embodiment, the BS 214 may further determine a fourth minimum allowed time duration T4MIN 524 and perform the selection of the cell-specific base carrier for at least the period of the fourth minimum allowed time duration T4MIN 524.

For correct setting of the maximum allowed time duration TMAX, the selection time duration TSEL and the first T1MIN, second T2MIN, third T3MIN and fourth T4MIN minimum allowed time duration, the following equation needs to be fulfilled:

$$TMAX >= N \times [M \times (T3MIN + T4MIN) + T2MIN] \quad (1)$$

where N is an integer number larger than zero indicating how many times the process 508 is repeated and M is an integer number larger than zero indicating how many times the processes 518 and 520 are repeated.

It should be noted that when the duration is determined as maximum or minimum, the process within the duration may end sooner or later than the determined time duration, respectively. However, when the time duration is a determined duration, such as the TSEL, the duration of the period is as determined.

Figure 6:
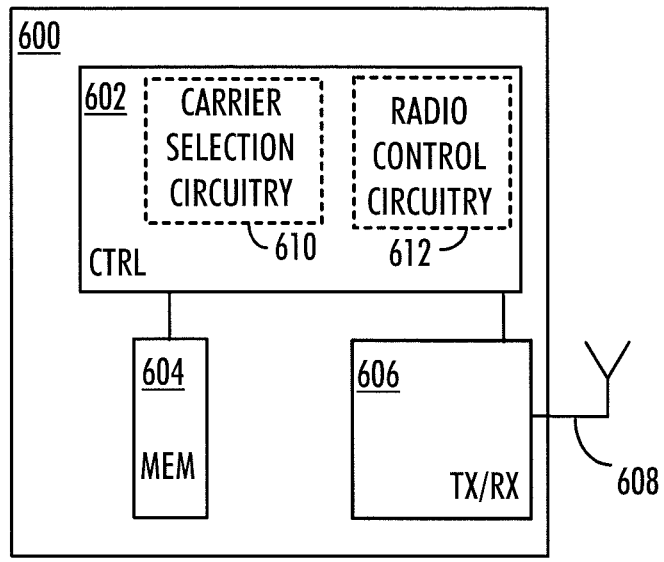
FIG. 6 shows an apparatus according to an embodiment.

As the process allows for reselection of the base carried based on possibly obtained information (such as feedback or broadcasted RRAT, for example), the selection of the base carrier may be called initial selection of the base carrier. This implies that the overall carrier selection 501 may lead to different carrier selection than the first selection performed in 508A (in case of repeated processes 508A to 508C). A very general architecture of an apparatus according to an embodiment is shown in FIG. 6. FIG. 6 shows only the elements and functional entities required for understanding the apparatus according to an embodiment. Other components have been omitted for reasons of simplicity. The implementation of the elements and functional entities may vary from that shown in FIG. 6. The connections shown in FIG. 6 are logical connections, and the actual physical connections may be different. The connections can be direct or indirect and there can merely be a functional relationship between components. It is apparent to a person skilled in the art that the apparatus may also comprise other functions and structures. The apparatus may be, for example, a base station 210 to 218 of FIG. 2, such as an eNB of the LTE.

The apparatus 600 for carrier selection may comprise a processor 602. The processor 602 may be implemented with a separate digital signal processor provided with suitable software embedded on a computer readable medium, or with a separate logic circuit, such as an application specific integrated circuit (ASIC). The processor 602 may comprise an interface, such as computer port, for providing communication capabilities. The processor 602 may be, for example, a dual-core processor or a multiple-core processor.

The apparatus 600 may comprise a memory 604 connected to the processor 602. However, memory may also be integrated to the processor 602 and, thus, no memory 604 may be required. The memory may store initial base carrier selections, path loss values, timing framework parameters such as TMAX, TSEL, T1MIN, T2MIN, T3MIN and T4MIN, for example.

The apparatus 600 may further comprise a transceiver (TRX) 606. The TRX 606 may further be connected to one or more antennas 608 enabling connection to and from an air interface. The TRX 606 may be used in signaling the selected base carrier, for example.

The processor 602 may comprise a radio control circuitry 612 for performing radio control related functionalities. The functionalities may comprise measuring the propagation loss of the received radio signals, for example. The processor 602 may comprise a carrier selection circuitry 610 for selecting the cell-specific base carrier.

As used in this application, the term 'circuitry' refers to all of the following: (a) hardware-only circuit implementations, such as implementations in only analog and/or digital circuitry, and (b) combinations of circuits and software (and/or firmware), such as (as applicable): (i) a combination of processor(s) or (ii) portions of processor(s)/software including digital signal processor(s), software, and memory(ies) that work together to cause an apparatus to perform various functions, and (c) circuits, such as a microprocessor(s) or a portion of a microprocessor(s), that require software or firmware for operation, even if the software or firmware is not physically present.

This definition of 'circuitry' applies to all uses of this term in this application. As a further example, as used in this application, the term 'circuitry' would also cover an implementation of merely a processor (or multiple processors) or a portion of a processor and its (or their) accompanying software and/or firmware. The term 'circuitry' would also cover, for example and if applicable to the particular element, a baseband integrated circuit or applications processor integrated circuit for a mobile phone or a similar integrated circuit in a server, a cellular network device, or another network device.

Figure 7:
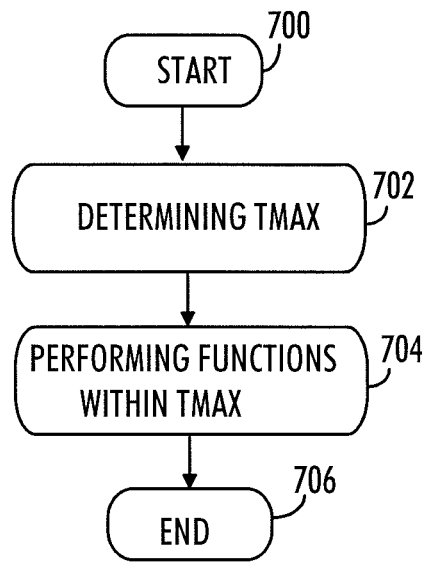
FIG. 7 shows a method for selecting the cell-specific carrier according to an embodiment.

FIG. 7 shows a method for performing the cell-specific base carrier selection. The selection may be performed as part of the ACCS. The method begins in step 700. In step 702, the method comprises determining a maximum allowed time duration. In step 704, the method comprises performing within the determined maximum allowed time duration: obtaining information related to one or more selected carriers from at least one neighboring base station, selecting the at least one cell-specific base carrier for data transmission on the basis of the obtained information, and informing the at least one neighboring base station of the selected cell-specific base carrier. The method ends in step 706.

The embodiments of the invention offer many advantages. The proposed embodiments provide a general timing framework for the base carrier selection. Although the embodiments have been described as using the matrix-based BC selection algorithm, the timing mechanisms proposed apply to any other similar de-centralized algorithm, i.e. running independently in each BS, which targets the selection of a BC based on broadcasted or signaled information from the neighboring BSs. Further, the embodiments provide a maximum allowed time-interval for this procedure to ensure that a state of indecisiveness is avoided. The iterative mechanism(s) used to refine the very first selection when more information becomes available during the maximum allowed time-interval ensure more reliable and optimum selection. The iterative processes may lead to for example iteratively building the matrix 400 of FIG. 4. The inter-BS signaling requirements (periodicity, repetition, etc.) during this procedure ensure at least close to optimal BC selection and adequate protection of the base carriers already selected by the neighboring BSs. The embodiments provide a simple but robust mechanism which ensures that all BSs running the ACCS process can select component carriers in a fair manner.

The techniques and methods described herein may be implemented by various means. For example, these techniques may be implemented in hardware (one or more devices), firmware (one or more devices), software (one or more modules), or combinations thereof. For a hardware implementation, the apparatus of FIG. 6 may be implemented within one or more application-specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof. For firmware or software, the implementation can be carried out through modules of at least one chip set (e.g. procedures, functions, and so on) that perform the functions described herein. The software codes may be stored in a memory unit and executed by processors. The memory unit may be implemented within the processor or externally to the processor. In the latter case, it can be communicatively coupled to the processor via various means, as is known in the art. Additionally, the components of the systems described herein may be rearranged and/or complemented by additional components in order to facilitate the achievements of the various aspects, etc., described with regard thereto, and they are not limited to the precise configurations set forth in the given figures, as will be appreciated by one skilled in the art.

Thus, according to an embodiment, the apparatus for performing the tasks of FIGS. 1 to 7 comprises processing means for determining a maximum allowed time duration, and processing means for performing within the determined maximum allowed time duration: obtaining information related to one or more selected carriers from at least one neighboring base station, selecting the at least one cell-specific base carrier for data transmission on the basis of the obtained information, and informing the at least one neighboring base station of the selected cell-specific base carrier. Embodiments of the invention may be implemented as computer programs according to the embodiments. The computer programs comprise instructions for executing a computer process for improving the cell-specific base carrier selection. The computer program implemented in the apparatus may carry out, but is not limited to, the tasks related to FIGS. 1 to 7. The computer program may be stored on a computer program distribution medium readable by a computer or a processor. The computer program medium may be, for example but not limited to, an electric, magnetic, optical, infrared or semiconductor system, device or transmission medium. The computer program medium may include at least one of the following media: a computer readable medium, a program storage medium, a record medium, a computer readable memory, a random access memory, an erasable programmable read-only memory, a computer readable software distribution package, a computer readable signal, a computer readable telecommunications signal, computer readable printed matter, and a computer readable compressed software package.

Even though the invention has been described above with reference to an example according to the accompanying drawings, it is clear that the invention is not restricted thereto but can be modified in several ways within the scope of the appended claims. Further, it is clear to a person skilled in the art that the described embodiments may, but are not required to, be combined with other embodiments in various ways.

The invention claimed is:

1. A method comprising:
   determining a maximum allowed time duration;
   determining a first minimum allowed time duration;
   performing a process of obtaining information related to one or more selected carriers from one or more neighboring base stations, selecting at least one cell-specific base carrier for data transmission on the basis of the obtained information, and informing the one or more neighboring base stations of the selected cell-specific base carrier, wherein the duration of the process is at least the period of the first minimum allowed time duration and is dynamically determined based on the number of the one or more neighboring base stations; and
   repeating the process, thus enabling reselection of the cell-specific base carrier, wherein the aggregate duration for the consecutive processes is within the determined maximum allowed time duration.

2. The method of claim 1, the method further comprising:
   disregarding the information obtained from a neighboring base station when it is determined that propagation loss from the neighboring base station is above a predefined threshold.

3. The method of claim 1, wherein the information related to one or more selected carriers from the one or more neighboring base stations indicates the one or more carriers the one or more neighboring base stations are applying and which of the one or more carriers applied is a base carrier primarily used for data transmission, wherein the possible carriers to be applied by any base station are predefined.

4. The method of claim 1, the method further comprising:
   obtaining information of the selected cell-specific base carrier from the one or more neighboring base stations; and
   repeating the process when the obtained information indicates that interference above a predefined threshold is caused to at least one of the one or more neighboring base stations.

5. The method of claim 1, wherein the time duration for each repeated process is no greater than the maximum allowed time duration.

6. The method of claim 1, the method further comprising:
   determining a selection time duration; and
   performing the process of obtaining information from at least one of the one or more neighboring base stations and selecting the cell-specific base carrier, wherein the duration of the process is the selection time duration.

7. The method of claim 6, the method further comprising:
   dynamically deciding to repeat the process of obtaining information from at least one of the one or more neighboring base stations and selecting the cell-specific base carrier, wherein the aggregate duration of the consecutive processes is the determined selection time duration.

8. A computer program product embodied on a non-transitory distribution medium readable by a computer and comprising program instructions which, when loaded into an apparatus, execute the method according to claim 1.

9. An apparatus comprising:
   at least one processor and at least one memory including a computer program code, wherein the at least one memory and the computer program code are configured, with the at least one processor, to cause the apparatus at least to:
   determine a maximum allowed time duration;
   determine a first minimum allowed time duration;
   perform a process of obtaining information related to one or more selected carriers from one or more neighboring base stations, selecting at least one cell-specific base carrier for data transmission on the basis of the obtained information, and informing the one or more neighboring base stations of the selected cell-specific base carrier, wherein the duration of the process is at least the period of the first minimum allowed time duration and is dynamically determined based on the number of the one or more neighboring base stations; and
   repeat the process, thus enabling reselection of the cell-specific base carrier, wherein the aggregate duration for the consecutive processes is within the determined maximum allowed time duration.

10. The apparatus of claim 9, wherein the at least one memory and the computer program code are further configured, with the at least one processor, to cause the apparatus to:

disregard the information obtained from a neighboring base station when it is determined that propagation loss from the neighboring base station is above a predefined threshold.

11. The apparatus of claim 9, wherein the information related to one or more selected carriers from the one or more neighboring base stations indicates the one or more carriers the one or more neighboring base stations are applying and which of the one or more carriers applied is a base carrier primarily used for data transmission, wherein the possible carriers to be applied by any base station are predefined.

12. The apparatus of claim 9, wherein the at least one memory and the computer program code are further configured, with the at least one processor, to cause the apparatus to:
   obtain information of the selected cell-specific base carrier from the one or more neighboring base stations; and
   repeat the process when the obtained information indicates that interference above a predefined threshold is caused to at least one of the one or more neighboring base stations.

13. The apparatus of claim 9, wherein
   the time duration for each repeated process is no greater than the maximum allowed time duration.

14. The apparatus of claim 9, wherein the at least one memory and the computer program code are further configured, with the at least one processor, to cause the apparatus to:
   determine a selection time duration; and
   perform the process of obtaining information from at least one of the one or more neighboring base stations and selecting the cell-specific base carrier, wherein the duration of the process is the selection time duration.

15. The apparatus of claim 14, wherein the at least one memory and the computer program code are further configured, with the at least one processor, to cause the apparatus to:
   dynamically decide to repeat the process of obtaining information from at least one of the one or more neighboring base stations and selecting the cell-specific base carrier, wherein the aggregate duration of the consecutive processes is the determined selection time duration.

16. An apparatus comprising:
   processing means for determining a maximum allowed time duration;
   processing means for determining a first minimum allowed time duration;
   processing means for performing a process of obtaining information related to one or more selected carriers from one or more neighboring base stations, selecting at least one cell-specific base carrier for data transmission on the basis of the obtained information, and informing the one or more neighboring base stations of the selected cell-specific base carrier, wherein the duration of the process is at least the period of the first minimum allowed time duration and is dynamically determined based on the number of the one or more neighboring base stations; and
   processing means for repeating the process, thus enabling reselection of the cell-specific base carrier, wherein the aggregate duration for the consecutive processes is within the determined maximum allowed time duration.

* * * * *